INVENTOR.
CHARLES E. MacKINNON
BY
Bean, Brooke, Buckley + Bean
ATTORNEYS

United States Patent Office 3,494,746
Patented Feb. 10, 1970

3,494,746
SOLVATING SYSTEM
Charles E. MacKinnon, Clarks Summit, Pa., assignor to International Salt Company, Clarks Summit, Pa.
Continuation of application Ser. No. 359,243, Apr. 13, 1964. This application Feb. 12, 1968, Ser. No. 704,950
The portion of the term of the patent subsequent to Feb. 22, 1983, has been disclaimed
Int. Cl. C01d 3/18, 3/06; B01d 11/02
U.S. Cl. 23—312           8 Claims

ABSTRACT OF THE DISCLOSURE

A method of preparing high purity sodium chloride saturated brine from rock salt containing calcium sulfate impurity by multistage dissolution. The solvent velocities in each of the dissolution zones is maintained at a rate such as to carry along and entrain an excess of the source salt introduced and all of the excess source salt, respectively.

---

This application is a continuation of application Ser. No. 359,243 filed Apr. 13, 1964.

This invention relates to a method for preparing high purity sodium chloride saturated brine and pertains, in particular, to such a method in which the starting materials are a substantially pure sodium chloride brine of relatively high sodium chloride concentration and a contaminated supply material such as run-of-mine rock salt.

The major impurity in mined rock salt is the mineral anhydrite, the anhydrous form of calcium sulfate ($CaSO_4$). The maximum solubility of calcium sulfate in a saturated sodium chloride brine at normal temperature and pressure is 5.5 grams per liter of brine, which represents substantial contamination. However, as is disclosed in my copending application Ser. No. 272,461 filed Apr. 11, 1963, now U.S. Patent 3,236,609 it is possible to materially reduce this contamination in brine and to provide a high purity sodium chloride saturated brine by making use of the fact that calcium sulfate is more slowly soluble than is sodium chloride. The present invention is directed to a process for the production of a sodium chloride saturated brine of minimum impurity content in which the starting materials are rock salt and a high purity unsaturated brine, the resultant saturated brine produced containing not more than about 0.1 gram of calcium sulfate contaminant per liter of brine. Thus, the present invention is particularly useful in the resaturation of mercury cell effluent brine, although the invention is of course not limited to such use.

A mercury cell is a well known apparatus for producing sodium hydroxide and chlorine in which sodium chloride brine is used as the basic raw material. For efficient operation of such devices, the brine should be saturated and as free from metallic contaminanats (i.e. calcium and magnesium) as possible. The concentrations of calcium and magnesium are successfully reduced by conventional inexpensive procedures, and sulfate ion remains a contaminant which requires expensive processing for successful removal thereof. Specifically, conventional removal of sulfate ion contaminant is performed by treating the sodium chloride brine with some barium-containing compound (i.e. barium carbonate or barium chloride) to yield a barium sulfate precipitate. Because of the relatively high cost of barium compounds, this conventional method of sulfate ion removal entails considerable expense. Consequently, any method effecting minimization of sulfate ion content incidental to the resaturation of mercury cell effluent brine will enable a corresponding minimization of the quantity of barium compounds used for limiting the degree of sulfate in contaminant content of the resaturated brine.

Whereas the methods of my above copending application are successful in minimizing calcium sulfate content in the production of sodium chloride saturated brine, such methods operate most efficiently when either water or a dilute brine is used as a starting solvent. In order to achieve maximum efficiency when the starting solvent is a brine of relative high sodium chloride concentration (i.e. greater than about 25–30% of sodium chloride saturation), the principles of the present invention are eminently successful. Therefore, it is of primary concern in connection with this invention to provide an improved method of producing a sodium chloride saturated brine, containing a minimum of calcium sulfate contaminant, from a starting solvent which is a high purity brine of relatively high sodium chloride concentration.

More specifically, of primary concern in connection with this invention is the highly efficient production of sodium chloride saturated brine under conditions in which the starting materials are a high purity brine of relatively high sodium chloride concentration and a source material such as rock salt containing calcium sulfate contaminant, and in which the process degrades to a minimum degree the purity of the starting solvent.

Although the present invention is closely related to the above mentioned copending application Ser. No. 272,461 filed Apr. 11, 1963, in that both employ solvent and contaminated source material (mined rock salt) as starting materials, the present invention is concerned in particular with the realization of high efficiency when the solvent is brine of relatively high sodium chloride concentration. Owing to the fact that a substantial excess of source salt is required to be introduced into a brine of high sodium chloride concentration in order to rapidly enough reach sodium chloride saturation without dissolving an undesirable amount of calcium sulfate, it is necessary to recover such excess in order to achieve a high efficiency of operation and, according to this invention, such excess is substantially completely recovered within the system itself.

Accordingly, it is an object of this invention to provide a method of producing sodium chloride saturated brine from high purity brine of relatively high sodium chloride concentration and rock salt; in which the majority of excess rock salt required to rapidly reach sodium chloride concentration is recovered within the system so that only a practical minimum amount of source material is rejected, and in which the sodium chloride saturated brine is characterized by minimum degradation of the purity of the starting solvent, the high purity brine of relatively high sodium chloride concentration.

Further, it is an object of this invention to provide a method of high purity saturated sodium chloride brine production in which a high purity, high sodium chloride concentration brine is divided in its flow within a conduit system so that a major part thereof is rapidly raised to sodium chloride saturation by the introduction of excess source salt; in which the excess source salt and solids are removed from the brine as soon as sodium chloride saturation is reached; and wherein the separated solids, inclusive of the excess salt, are introduced into a minor part or stream of the unsaturated brine to dissolve at least a majority of the excess source salt in reaching a saturated brine from the minor part of the flow.

Other objects and advantages of the invention will appear from the description hereinbelow and the accompanying drawing wherein.

Although the present invention is herein described in conjunction with the resaturation of 85% sodium chloride saturated brine for feeding a mercury cell used to produce sodium hydroxide and chlorine, it will be understood that the principles of this invention may be utilized whenever the starting material solvent is a brine having a relatively high sodium chloride concentration. By "relatively high" sodium chloride concentration is meant those brines containing more than about 25–30% of sodium chloride saturation.

Figure 1:
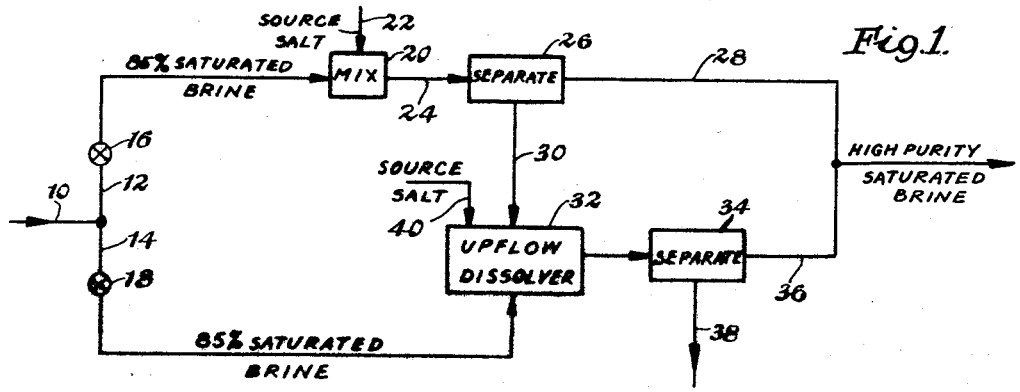
FIG. 1 is a diagrammatic view illustrating one form of this invention.

With reference to FIG. 1, the starting material solvent is shown therein as being introduced in the conduit 10 and consists of high purity brine containing about 85% of sodium chloride saturation, being the effluent from a mercury cell, as aforesaid. The solvent flow is divided into parallel paths in the conduits 12 and 14 and the relative rates of flow adjusted as by the valves 16 and 18. The major portion of the flow enters the conduit 12 and passes to the mixer 20 whereat source salt is introduced into the stream, as indicated by the line 22. The flow rate of the brine is adjusted such that enough source salt to produce sodium chloride saturation plus an excess of about 10% is entrained and carried along by the solvent brine into the line 24. A liquid-solid separation is effected as soon as the brine reaches sodium chloride saturation, such separation being carried out in a suitable separator 26 such as a cyclone separator as disclosed in the above mentioned copending applications. Thus, the line 28 contains a major flow of sodium chloride saturated brine essentially free of solids entrained therein while the solids phase of the separation contains the excess source salt, undissolved calcium sulfate impurity and insolubles, if any, in the line 30. Additionally, the line 30 will contain a very minor amount of sodium chloride saturated brine to complete the separated slurry.

This slurry may be discharged into a conventional upflow dissolver 32 and even though the sodium chloride saturated brine produced from this dissolver and as present in the line 36 after separation in the cyclone separator 34 will not be as pure as is the brine in line 28, only minor degradation of the output will occur since the flow in the lower branch of FIG. 1 is minor compared with the upper branch. That is, the flow rate in the lower branch need be only a minor amount of the total flow in the line 10 in order to dissolve all of the remaining source salt which is available so that the rejected slurry at 38 thereby contains a practical minimum, if any, of the original source salt from either of the inputs 22 or 40.

The particular system shown in FIG. 1 may be used when it is desired to convert a conventional system to the principles of this invention without scrapping the upflow dissolver. Thus, in the system of FIG. 1, the mixer 20 and the separators 26 and 34 might be installed as new equipment to provide, with the conventional dissolver, the improved system herein. The mixer 20 is preferably formed by a suitable centrifugal pump cooperating with a funnel-like hopper device discharging source salt directly to the pump inlet separately from the 85% saturated brine. Alternatively, some of the infeed 85% saturated brine may be introduced into the hopper device near the outlet thereof to act as a means for initiating and maintaining downflow movement of the source salt. In any event, the object is to integrate the source salt into the solvent stream and to flow therewith.

A very important ancillary advantage stems from the present invention. Generally speaking, mined rock salt is provided in several commercial grades according to particle size in which the coarser grades are ordinarily in greater demand. As a consequence, the finest grade or FC (fine chemical) salt may be difficult to sell even though its cost is lowest. Disposal of this unsold fine salt is a costly procedure for the salt producer. With systems according to the present invention, it is not only possible, but it is desirable to use source salt of fine particle size since greater surface area is exposed, and hence dissolution is more rapid, with the finer particle sizes. This represents an important commercial advantage.

Figure 2:
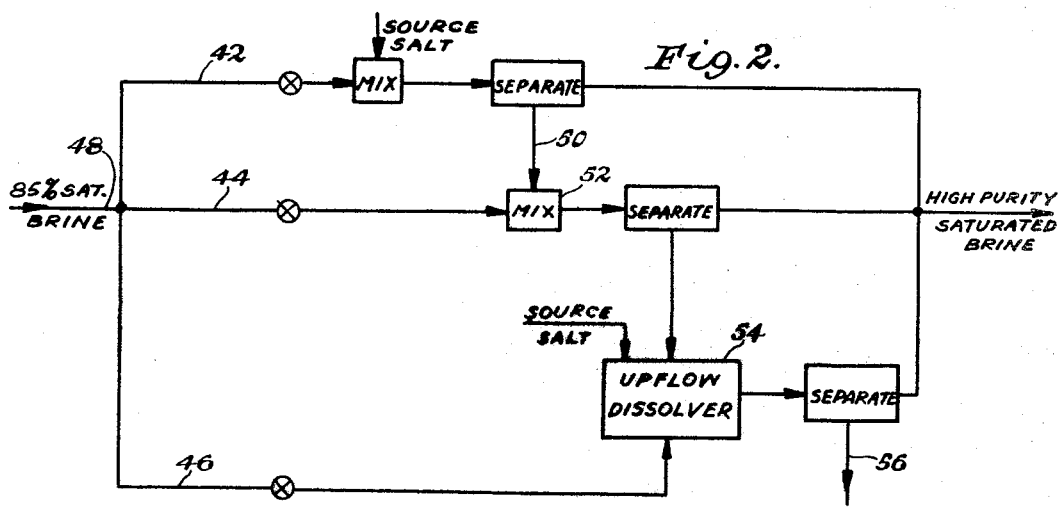
FIG. 2 is a diagrammatic view illustrating another form of this invention.

In the system of FIG. 2, an even lesser degradation due to the use of an upflow dissolver, as above, is achieved. In this system, three branches 42, 44 and 46 are provided from the input at 48. The upper two branches are identical with the upper branch of FIG. 1 with the slurry rejected at 50 from the uppermost branch being used as the source for the mixer 52 of the second branch. Likewise, the lower branch of FIG. 2 is identical with the second or lower branch of FIG. 1. Thus, in FIG. 2, the flow rates in the various branches are adjusted so that the flow in the branch 44 is only a minor part of the flow in the branch 42 and so that the flow in branch 46 is only a minor part of the flow in branch 44. Thus, the principal source of degradation, the upflow dissolver 54 in the lowermost branch 46, represents but a very small fraction of the total flow. Here again, the reject slurry at 56 contains essentially no undissolved source salt.

Figure 3:
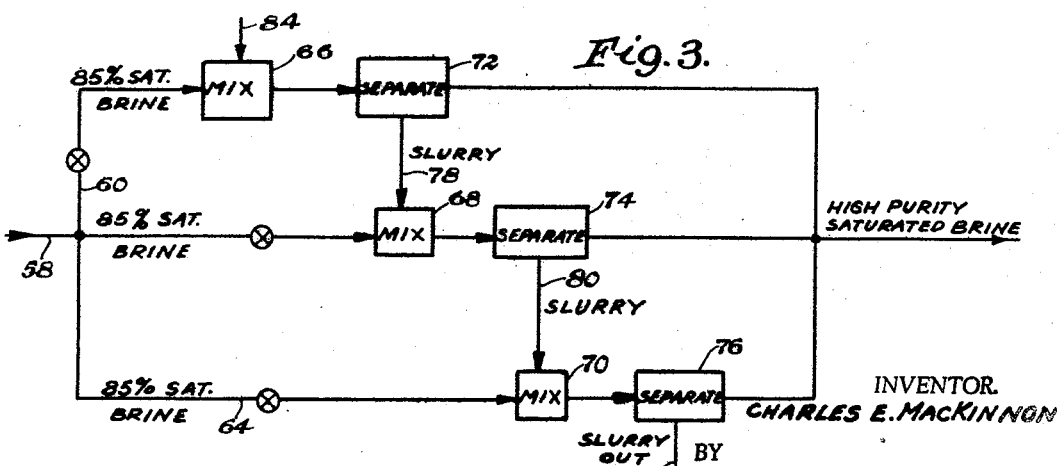
FIG. 3 is a diagrammatic view illustrating still another form of this invention.

As in the case of FIG. 1, the system of FIG. 2 may result from an installation supplanting brine production solely from the conventional upflow dissolver 54. An ideal system, resulting in the minimum introduction of calcium sulfate contaminant into the saturated brine, would eliminate the upflow dissolver entirely. Such a system would use a pump-hopper combination as aforesaid to form the mixer and this would be followed by a centrifugal separator having its solids discharge directed to the inlet of a second pump to form therewith the mixer of a second branch having an associated centrifugal separator, and so on for as many branches as may be desired. Such a system, as is hereinafter described with respect to FIG. 3, not only will achieve minimum contaminant introduction but will also occupy but a fraction of the space required by conventional dissolver systems.

As has been stated before, mercury cell operation involves the infeed of saturated brine obtained by resaturation of the mercury cell effluent. Hence, it is essentially a closed system insofar as the brine is concerned. As a result, all of the contaminants introduced in the resaturation process must be removed if the level of contaminants is to be maintained at or below a predetermined maximum. As has also been stated hereinbefore, the removal of metallic contaminants is effectively and economically achieved by methods well known in the art, but the removal of sulfate ion contaminant remains a costly procedure due to the necessity for using expensive compounds for this purpose. Thus, with the present invention, the purity of the effluent, which is at or below the aforesaid maximum level of contaminants, is degraded to a minimum degree insofar as the most costly contaminant is concerned and, as a result, the quantity of material required to be added to remove the sulfate ion is sharply and substantially reduced. This offers distinct and significant commercial advantage.

In FIG. 3, the input 58 is again divided into three parallel branches 60, 62 and 64, each having a mixer as at 66, 68 and 70 followed by the respective separators 72, 74 and 76. The source salt is introduced in the first branch 60 and the slurry, at 78, from this branch is used as the source for the mixer 68 of the second branch. The slurry at 80 from the second branch is used as the source for the mixer 70 of the third branch, whereas the reject slurry at 82 from the third branch contains essentially no undissolved source salt.

Representatively, it will be necessary to introduce about 10% excess of salt in the first branch 60 in order to assure rapid attainment of sodium chloride concentration before any significant amount of calcium sulfate goes into solution. Thus, if this condition is to prevail in each of the branches, the slurry at 78 will contain 10% of the total source salt introduced, the slurry at 80 will contain 1% of the total source salt introduced, and the slurry at 82 will contain .1% of the total source salt introduced. Similarly, it will be seen that the flow rates in the several branches must be adjusted in like fashion. Thus, assuming an input flow rate of 100 g.p.m., the flow in branch 60 would be 90 g.p.m., that in branch 62 would be 9 g.p.m., and that in branch 64 would be .9 g.p.m., the residual flow of .1 g.p.m. being present in the slurry at 82.

It is to be understood that certain changes and modifications as illustrated and described may be made without departing from the spirit of the invention or the scope of the following claims.

What is claimed is:

1. In the method of continuously making a high purity sodium chloride saturated brine from source material which is sodium chloride contaminated with calcium sulfate, the steps of:

forming a sodium chloride solvent region by continuously flowing water at less than sodium chloride saturation into one end of said region so that the flow of solvent within said region is from said one end to the opposite end thereof, forming a first solvent-solids mixture zone within said region by continuously introducing source material into the solvent while maintaining the flow rate of solvent within said first zone sufficient to entrain and carry along, cocurrently with the solvent, an amount of source material in excess of that required for sodium chloride saturation of the solvent entering such zone, continuously positively separating the solvent from the excess source material in said first zone as soon as the solvent in said first zone has reached sodium chloride saturation but substantially before any calcium sulfate has gone into solution, and continuously separately discharging the sodium chloride saturated brine and the excess source material so obtained, forming a second solvent-solids mixture zone within said region by continuously introducing said discharged excess source material into the solvent while maintaining the flow rate of solvent within said second zone sufficient to entrain and carry along, cocurrently with the solvent, all of said excess source material, continuously positively separating the solvent from the solids in said second zone as soon as at least a substantial part of the sodium chloride content of said excess source material is leached therefrom but substantially before any of the calcium sulfate has gone into solution, and continuously separately discharging the high purity brine and the residual solids so obtained.

2. In the method according to claim 1 wherein said region includes at least two parallel branches, one of which contains said first zone and the other of which contains said second zone, the high purity brine discharged from said second zone being sodium chloride saturated brine.

3. In the method of continuously making a high purity sodium chloride saturated brine from source material which is sodium chloride contaminated with calcium sulfate, the steps of:

forming a sodium chloride solvent region by continuously flowing a high purity dilute sodium chloride brine into one end of said region so that the flow of solvent within said region is from said one end to the opposite end thereof, forming a first solvent-solids mixture zone within said region by continuously introducing source material into the solvent in an amount in excess of that required for sodium chloride saturation of the solvent entering such zone, while maintaining the flow rate of solvent within said first zone sufficient to entrain and carry along, cocurrently with the solvent all of the source material introduced, continuously positively separating the solvent from the excess source material in said first zone as soon as the solvent in said first zone has reached sodium chloride saturation but substantially before any calcium sulfate has gone into solution, and continuously separately discharging the sodium chloride saturated brine and the excess source material so obtained, forming a second solvent-solids mixture zone within said region by continuously introducing said discharged excess source material into the solvent while maintaining the flow rate of solvent within said second zone sufficient to entrain and carry along, cocurrently with the solvent, all of said excess source material, continuously positively separating the solvent from the solids in said second zone as soon as at least a substantial part of the sodium chloride content of said excess source material is leached therefrom but substantially before any of the calcium sulfate has gone into solution, and continuously separately discharging the high purity brine and the residual solids so obtained.

4. In the method according to claim 3 wherein said region includes at least two parallel branches, one of which contains said first zone and the other of which contains said second zone, the high purity brine discharged from said second zone being sodium chloride saturated brine.

5. In the method of continuously making a high purity sodium chloride saturated brine from source material which is sodium chloride contaminated with calcium sulfate, the steps of:

forming a sodium chloride solvent region having parallel branches by continuously flowing a high purity dilute sodium chloride brine into one end of said region so that the flow of solvent within said region is from said one end to the opposite end thereof, forming a first solvent-solids mixture zone within one branch of said region by continuously introducing source material into the solvent while maintaining the flow rate of solvent within said first zone sufficient to entrain and carry along, cocurrently with the solvent, an amount of source material in excess of that required for sodium chloride saturation of the solvent entering such zone, continuously positively separating the solvent from the excess source material in said first zone as soon as the solvent in said first zone has reached sodium chloride saturation but substantially before any calcium sulfate has gone into solution, and continuously separately discharging the sodium chloride saturated brine and the excess source material so obtained.

forming a second solvent-solids mixture zone within another branch of said region by continuously introducing said discharged excess source material into the solvent while maintaining the flow rate of solvent within said second zone sufficient to entrain and carry along, cocurrently with the solvent, all of said excess source material, continuously positively separating the solvent from the solids in said second zone as soon as at least a substantial part of the sodium chloride content of said excess source material sufficient to effect sodium chloride saturation of the solvent in said second zone is leached therefrom but substantially before any of the calcium sulfate has gone into solution, and continuously separately discharging the high purity sodium chloride saturated brine and the residual solids so obtained, the amount of excess source material present in said first zone being in the order of 10% of the total amount of source material introduced into the solvent to form said first zone.

6. In the method of continuously making a high purity sodium chloride saturated brine from source material which is sodium chloride contaminated with calcium sulfate, the steps of:

forming a region capable of dissolving sodium chloride by continuously flowing water at less than sodium chloride saturation into one end of said region, forming a first liquid-solids mixture zone within said region and beginning at a point within said region defined by nearly saturated, high purity sodium chloride brine by continuously contacting source material with said nearly saturated brine entering said first zone while maintaining the flow rate within the zone sufficient to entrain and carry along, cocurrently with said nearly saturated brine, an amount of source material such that the terminus of said first zone is defined by a mixture of high purity brine which has substantially just reached sodium chloride saturation but substantially without dissolving any calcium sulfate and an excess of undissolved source material, continuously positively separating the high purity sodium chloride saturated brine from said undissolved excess source material at said terminus of said first zone, and continuously separately discharging said high purity saturated brine and said excess undissolved source material, forming a second liquid-solids mixture zone within said region by continuously introducing said discharged excess source material into the solvent entering said second zone while maintaining the flow rate of solvent within said second zone sufficient to entrain and carry along, cocurrently with the solvent, all of said excess source material, continuously positively separating the solvent from the solids in said second zone as soon as the solvent has been substantially enriched as to sodium chloride content but substantially before any calcium sulfate has gone into solution, and continuously discharging the sodium chloride enriched solvent and the separated solids.

7. In the method according to claim 6 wherein said region includes at least two parallel branches, said first zone being in one branch and said second zone being in the other branch, said sodium chloride enriched solvent discharged from the second zone being sodium chloride saturated brine.

8. In the method of continuously making a high purity sodium chloride brine from a source of sodium chloride containing impurities having a dissolution rate less than the dissolution rate of sodium chloride, and a solvent source which is water at less than sodium chloride saturation, which comprises:

as an initial stage, continuously cocurrently flowing a high purity dilute sodium chloride brine obtained from said solvent source into contact with source salt at a flow rate sufficient to entrain a quantity of source salt in excess of that required for sodium chloride saturation of the dilute brine, continuously and positively separating the flowing brine from the solids entrained therein substantially immediately upon attainment of substantially sodium chloride saturated brine and discharging said brine, as a final stage, continuously cocurrently flowing the separated solids from a preceding stage with solvent obtained from said source in a ratio of solids to solvent such as to dissolve substantially all of the undissolved sodium chloride from the solids and substantially without dissolving any impurities to form sodium chloride enriched solvent at a rate to entrain and carry along any residual solids, substantially immediately continuously and positively separating the sodium chloride enriched solvent and the residual solids and discharging said solids to waste.

References Cited

UNITED STATES PATENTS

| | | | |
|---|---|---|---|
| 1,589,519 | 6/1926 | Dolbear | 23—312 |
| 2,734,804 | 2/1956 | Courthope | 23—312 X |
| 3,168,379 | 2/1965 | Miller | 23—312 |
| 3,236,609 | 2/1966 | MacKinnon | 23—312 |

FOREIGN PATENTS 1,342,620  9/1963  France.

OTHER REFERENCES

Perry: Chemical Engineer's Handbook, 3rd ed.; McGraw-Hill Book Co., New York, 1950, pp. 716–718.

NORMAN YUDKOFF, Primary Examiner

S. J. EMERY, Assistant Examiner

U.S. Cl. X.R.

23—89